March 11, 1958    S. J. GARTNER ET AL    2,826,004
TUBULATING MACHINE AND METHOD
Filed May 4, 1951                                 4 Sheets-Sheet 1

INVENTOR
STANLEY J. GARTNER
HENRY W. ROEBER
BY
ATTORNEY

March 11, 1958     S. J. GARTNER ET AL     2,826,004
TUBULATING MACHINE AND METHOD Filed May 4, 1951     4 Sheets-Sheet 2

INVENTOR
STANLEY J. GARTNER
HENRY W. ROEBER
BY
ATTORNEY

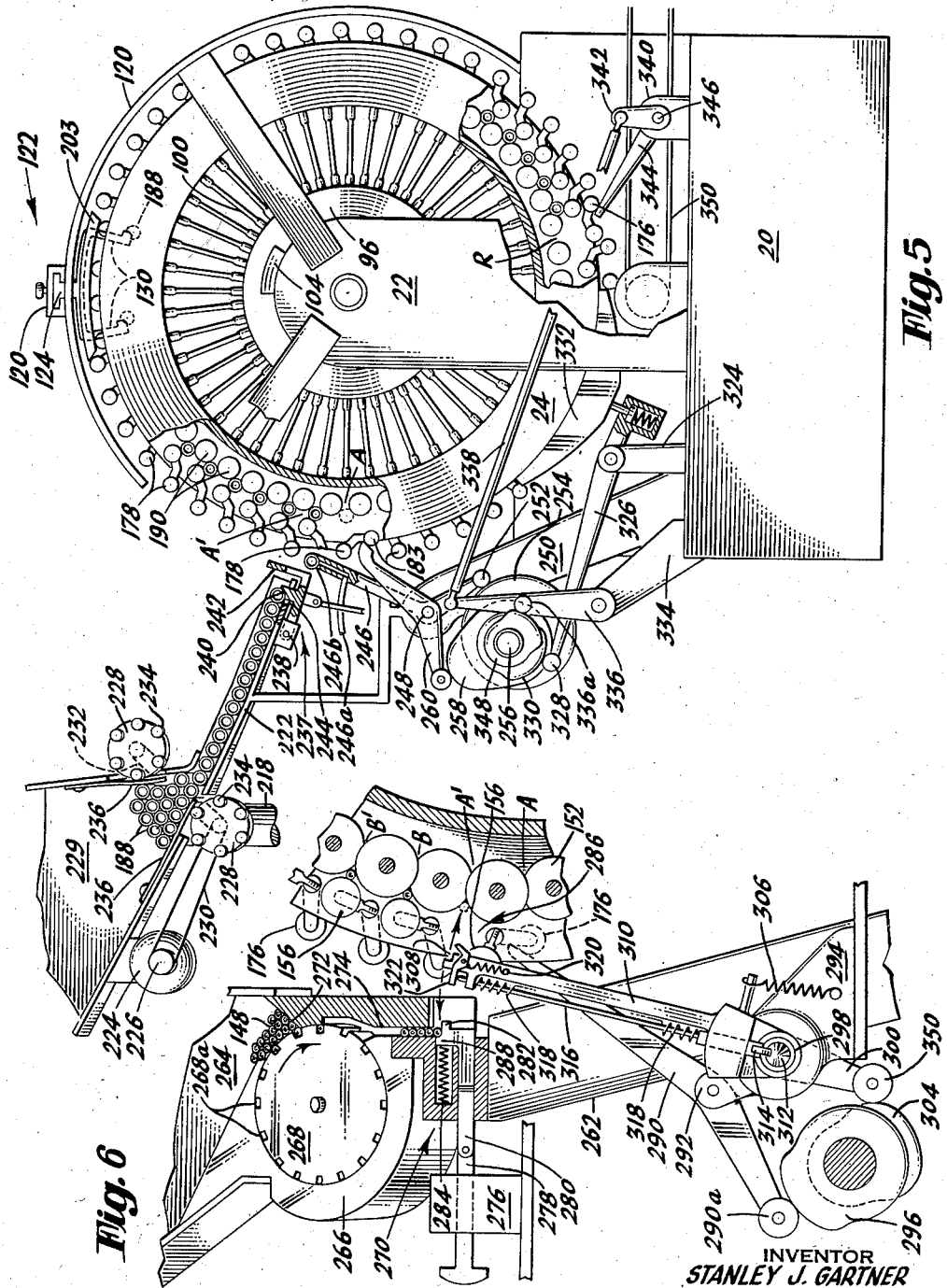

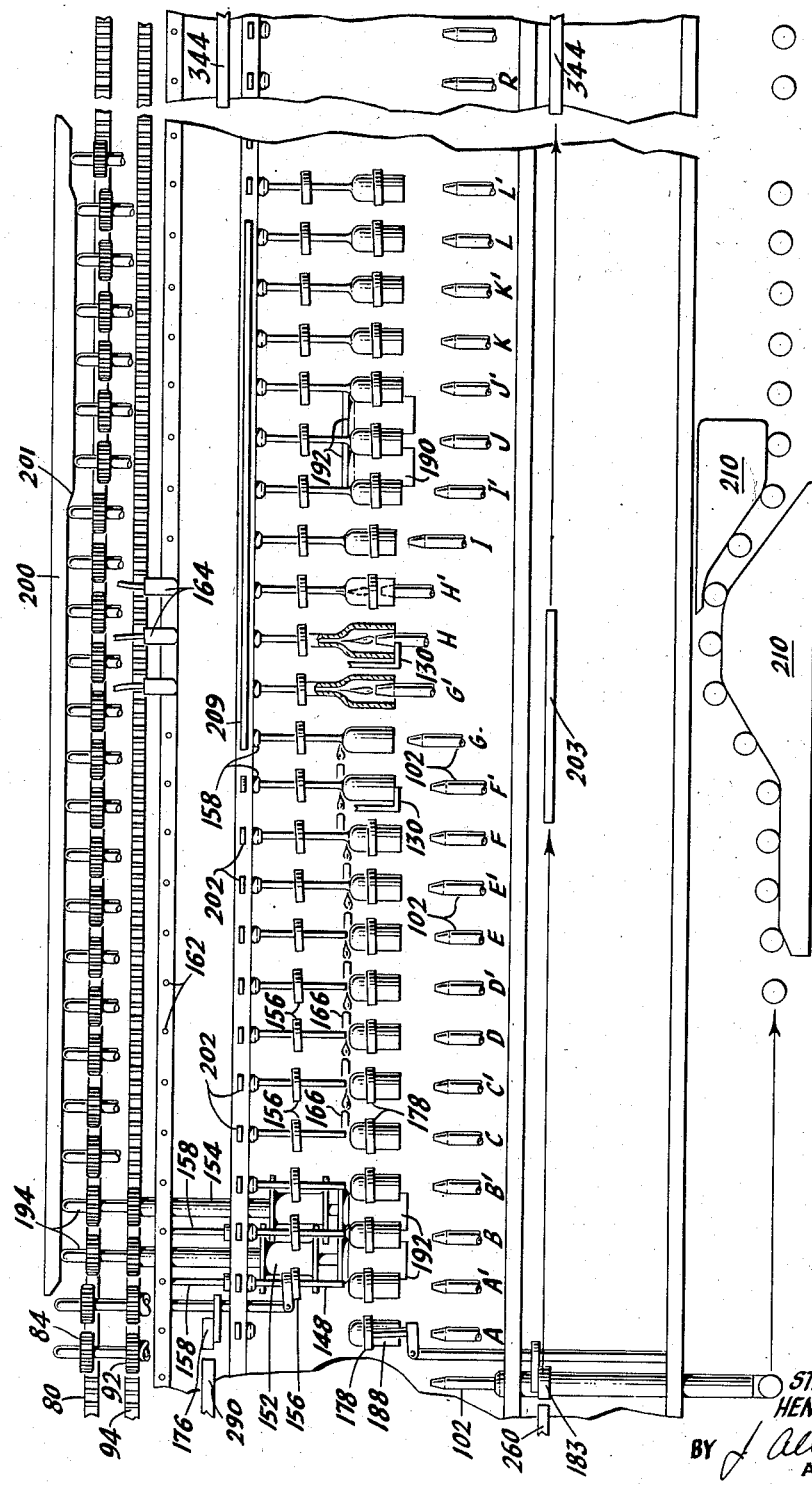

United States Patent Office 2,826,004
Patented Mar. 11, 1958

2,826,004

TUBULATING MACHINE AND METHOD

Stanley J. Gartner and Henry W. Roeber, Emporium, Pa., assignors to Sylvania Electric Products Inc., a corporation of Massachusetts Application May 4, 1951, Serial No. 224,582

29 Claims. (Cl. 49—2)

This invention relates to a new and improved tubulating machine; i. e. a machine for sealing the glass exhaust tube to the bulb in the manufacture of electronic tubes. As is well known, such operations are customarily done on automatic machines which heat the glass, join the elements, shape the joint and permit it to cool, so that the joined bulb and tube can be removed.

However, all such machines with which we are familiar have heretofore required the bulb and exhaust tube to be manually inserted in collinear chucks which are arranged to rotate together. Such machines have ordinarily utilized a horizontally rotating turret having a number of such chuck arrangements which are, in succession, passed through stations which perform the glass working operations. The time required to mount the tubes and bulbs in the chucks and remove them after sealing has seriously limited the production capacity per machine.

In accordance with one aspect of this invention, instead of being mounted in chucks for joining, the tubes and bulbs are supported and ride on horizontal rotary supports or spindles in a manner similar to the way work is supported in a centerless grinder, and the feed of tubes and bulbs and the removal of the completed product are carried out automatically, permitting the machine to operate at a speed considerably greater than heretofore obtainable.

Among the objects of the present invention are:

To increase the speed of production of tubulated glass bulbs;

To provide a bulb tubulating machine in which the capacity is considerably greater than in heretofore known machines;

To automatically load glass bulb tubulating machines and to discharge the finished product;

To provide new and improved mechanism for handling the tube and bulb during the process of joining them;

To provide an improved machine of the class described, in which the turret or rotor is mounted with its axis horizontal instead of vertical as heretofore usual; and, To provide improved mechanism for making the joint between bulb and tube, for shaping the bulb adjacent the joint and for opening the bulb wall to connect the tube and bulb interior spaces.

Still other objects and advantages of our invention, while not specifically mentioned above, will be apparent from the specification. The features of novelty which we believe to be characteristic of our invention are set forth with particularity in the appended claims. Our invention itself, however, both as to its fundamental principles and as to its particular embodiments will best be understood by reference to the specification and accompanying drawing describing and showing one embodiment of the invention as presently preferred. In the drawing, Figure 1 is an elevational view of the machine, partly in section, disclosing the turret or rotor and its indexing means in combination with the spindle and spindle drive.

Figure 5 is a side elevation of the machine showing the bulb load and release mechanisms.

Figure 6 is an enlarged fragmentary side elevation partly in section of the exhaust tube feed and transfer mechanisms in relation to the turret.

Figure 7 shows diagrammatically the step-by-step operations of the machine in joining the tube and bulb.

Figure 1:
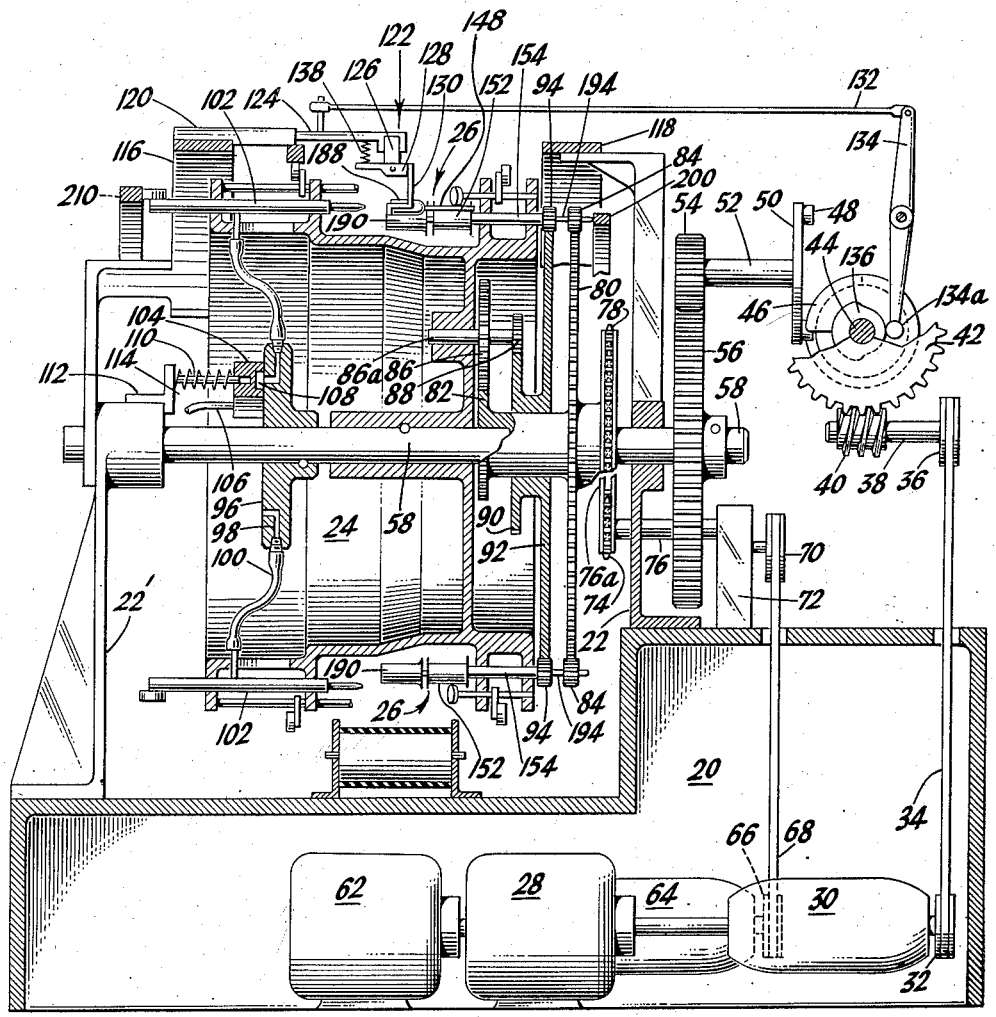

Reference is made to Figure 1 which shows the machine supported on a base 20 including spaced bearing standards 22 and 22'. Mounted therebetween is a turret or rotor 24 generally resembling a squirrel cage, with its axis horizontal, and having a multiplicity of supports or spindles 26, arranged circumferentially around the rotor and parallel to the rotor axis, the rotor and spindles being independently driven by motors 28 and 62 located below the base 20. The rotor indexing motor 28 and variable speed transmission 30 (with suitable speed selector control, not shown) have a driving pulley 32 which, by means of a belt 34, drives pulley 36 on the shaft 38. On the shaft 38 is mounted the worm gear 40 engaging the worm wheel 42 which drives the shaft 44. The shaft 44 carries a barrel cam 46, the groove of which successively engages the pegs or rollers 48 of the indexing plate 50 secured on the shaft 52 carrying spur gear 54, thereby imparting a step-by-step rotation to gear 54. Gears 54 and 56, in mesh, drive shaft 58 to which is keyed the rotor 24. The driving arrangement thus imparts a step-by-step rotation to the rotor 24, intervals between motion being employed to effect certain operations on the article being manufactured. Other well known mechanisms for imparting step-by-step rotation to rotor 24 may be employed instead of the specific index mechanism shown, if desired.

The spindle drive mechanism comprises its motor 62 and variable speed transmission 64, drive pulley 66, belt 68 and driven pulley 70 driving gears in gear box 72. The output of gear box 72 drives the sprocket 74 through shaft 76. The sprocket 74 carries chain 76a driving sprocket 78 which is rotatably mounted on shaft 58. Gears 80 and 82 are joined to sprocket 78 for rotation therewith. Gear 80 is in mesh with and drives a multiplicity of spur gears 84 keyed on shafts 194. Each shaft 194 carries a bulb spindle element 190. Gear 82 engages and drives a gear train comprising gears 86, 88 on common shaft 86a, an idler gear 90, 92 and finally the gears 94 secured on sleeves 154, surrounding shafts 194, and which drive each tube spindle element 152.

Secured to the shaft 58 is a manifold hub 96 having openings 98 and a number of fuel lines 100, the number of fuel lines and openings being equal to the number of burners 102 to which they are connected. A stationary manifold shoe 104 carries the main feed line 106 which feeds fuel to the annular groove 108 located on a common radius with and encompassing only the number of openings in hub 96 to which gas is to be fed. The shoe 104 is slidably mounted on a number of rods 110 fixed in bracket 112 of the standard 22 and is urged against the face of manifold hub 96 by means of compression spring 114 to prevent leakage between the faces of shoe 104 and manifold hub 96.

Figure 2:
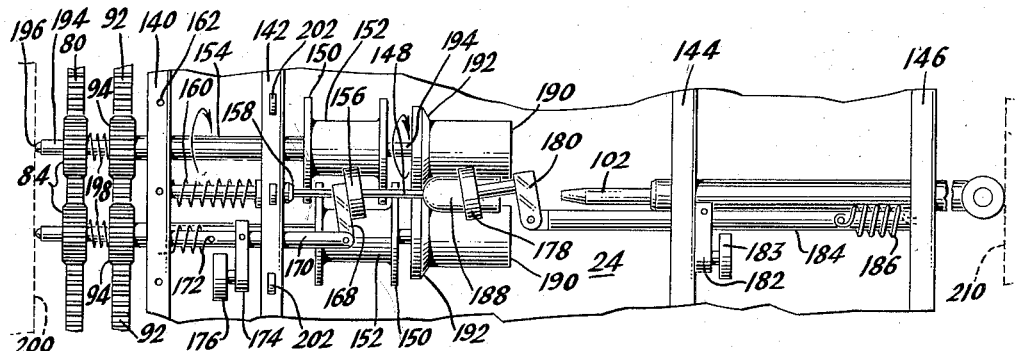
Figure 2 is a partial plan view showing a pair of spindles and controlling means supporting an exhaust tube and bulb.

Standards 22 and 22' carry circumferential stationary cam track supports 118 and 116 respectively. The latter also carries trough 120 in which the bulb pullover unit 122 is slidably mounted. Unit 122 comprises a slide 124 having extension 126. Pivotably mounted on the extension 126 are elements 128 and fingers 130 which engage the open end of bulb 188 and move it and its carrying spindles 190 to the left in Figures 2 and 3 (to the right in Figure 1) to be joined to the exhaust tube 148. In Figure 1, motion is imparted to the pullover unit through the use of the extension lever 132, and pivoted arm 134 carrying follower 134a which rides on the surface of cam 136, whereby the rotation of cam 136 causes a reciprocating movement of fingers 130. A compression spring 138 is interposed between the slide 124 and element 128 to act as a shock absorber whereby undesirable "ramming" of the bulb against the exhaust tube is prevented.

Rotor 24 is provided with four flange like extensions 140, 142, 144 and 146 (see Fig. 3 particularly) employed to support the spindles and their various components.

Figure 3:
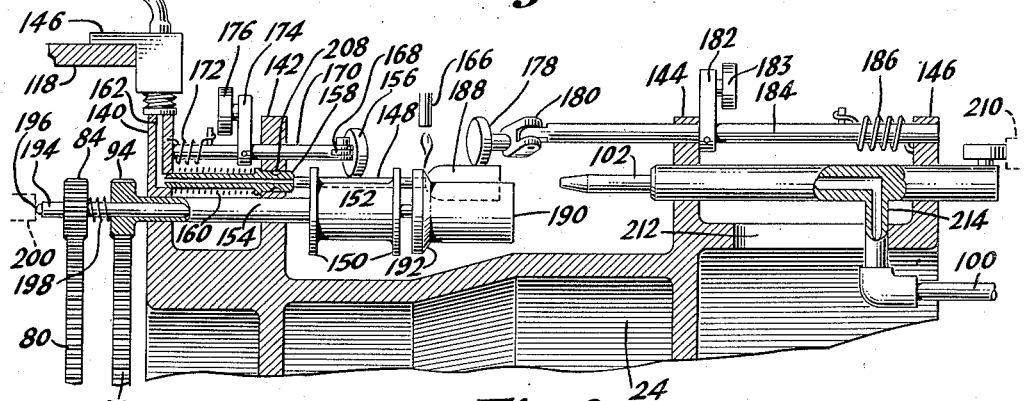
Figure 3 is a fragmentary elevational view showing a portion of the machine in enlarged cross section.

Exhaust tubes 148 are successively seated between and are rotated by engagement with the periphery of the annular extensions 150 of adjacent rollers 152, these rollers being mounted on sleeves 154 carrying spur gears 94. The exhaust tubes are normally held in position on the spindle rollers by the angularly disposed spring pressed rollers 156 which cause the exhaust tube to continuously bear against rotatably mounted tubular elements 158. These press against the left hand end of tube 148 (Figure 3). Compression springs 160, surrounding the shanks of elements 158 urge them to the right (Fig. 3) and assure contact between the exhaust tube 148 and element 158.

The turret flange 140 is provided with suction feed passages 162, successively indexed into position under a number of suction feed shoes 164 which are secured to the fixed support 118. When the glass components become sufficiently soft under the burners 166 and the piercing burners 102 to be described, the suction feed shoe provides a suction within the exhaust tube which with the action of the piercing burners effects an opening in the dome of the bulb. The number of air shoes used may vary, certain of them being employed as aids in cooling the completed product.

Rollers 156 are each carried by adjustable extension arms 168 (Figures 2 and 3) extending from shafts 170 and each is normally held against the exhaust tube under tension of spring 172. Fixed to the shaft 170 is an actuating arm 174 bearing cam roller 176. The arms 168 and 174 extend from the shaft 170 at approximately right angles to each other. As the rotor 24 is indexed through a revolution, roller 176 at certain stations comes into contact with and is depressed by stationary cam tracks or levers to be described, and, against the tension of spring 172, swings the roller 156 in an arcuate path away from the exhaust tube, releasing the exhaust tube. A similar bulb holding roller 178 operates in the same manner over the supports for the bulb 188 and includes the arms 180, 182, cam roller 183, shaft 184 and torsion spring 186.

Bulb 188 is rotated between the rollers 190 and is at times urged against the contour flange 192 by the roller 178. Each roller 190 has a shaft 194 journaled in the sleeve 154 for rotation. Shafts 194 are also arranged for axial reciprocation. Shafts 194 each carry a gear 84 as previously described and cam follower 196. Compression spring 198 interposed between the gears 94 and 84 urges the cam follower 196 against the stationary cam track 200, effecting a horizontal motion, over a number of stations of the shaft 194, depending on the contour of cam track 200. The motion of shaft 194 causes the bulb 188 to be slightly withdrawn from the exhaust tube, thereby stretching the softened joint and, with the aid of the bulb pullover unit 122 (Figs. 1 and 7), again compressing it. The process of alternately stretching and compressing the softened joint assures a good union of the glass elements and is commonly known in the art as "puddling." It will be understood that the axial motion of the shaft 194 due to cam action is slight and will not move gears 84 and 80 out of mesh.

Figure 4:
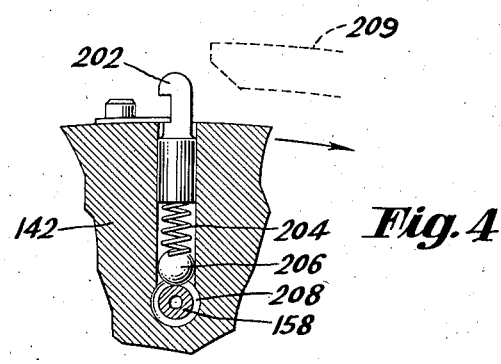
Figure 4 is a sectional view of the exhaust tube support locking device and its relation to the cam track which operates it.

During the "puddling" and bulb piercing operations, it will be apparent that any undesired horizontal motion of the element 158 would detract from the precise control of the amount of tension or compression applied to the softened glass, so a lock to prevent such motion has been provided, as shown in Figure 4. This comprises plunger 202, compression spring 204 and ball bearing 206 which rides in a concave annular groove 208 in the element 158. As a given exhaust tube is indexed to those stations where locking becomes necessary, the plunger 202 is engaged by a cam 209 (see Figures 4 and 7) compressing spring 204 and urging ball 206 into groove 208 thus preventing horizontal motion of the element 158 while still permitting it to rotate in contact with the exhaust tube 148.

Piercing burners 102 are mounted circumferentially around the turret in direct axial alignment with the open ends of bulbs 188. Each burner 102 is reciprocally mounted for entry into and withdrawal from the confines of bulb 188 as dictated by the location and contour of cam track 210 shown best in the "stretch-out" of Figure 7. Depending from each burner 102 and extending through the slot 212 (see Figure 3) is the fuel feed line 214 which connects to the fuel manifold hub 96 through line 100 of Figures 1 and 5.

Figure 5 shows a standard 218 supporting a bulb feed hopper 220. The hopper 220 is supplied with bulbs 188 which pass into the channel 222 one at a time. Jamming is prevented by an agitating mechanism comprising a motor 224 with pulley 226 driving wheels 228 through belts 230, 232. The wheels 228 have rollers 234 which successively engage and periodically flex leaf springs 236.

An escapement mechanism 237 pivoted at 238, has a stop seat 240 and gate 242. The seat 240 extends into a slot 244 of the channel 222 at its extreme end, the slot being of smaller length than the length of the bulb. With withdrawal of the seat 240 from the slot one bulb is permitted to advance to the gate. Reversal of the escapement motion causes simultaneous elevation of seat and gate, the seat checking advance of succeeding bulbs and the gate permitting the free bulb to be engaged by the pickup mouth 246b of the tubular transfer arm 246. The hollow interior of arm 246 is connected to a vacuum line 246a the suction of which retains the bulb in the seat 246b of arm 246. The transfer arm is pivoted on shaft 248 of standard 250 and has cam follower 252 in engagement with the cam 254 of cam shaft 256. Cam 258 operating in timed relationship with the index of turret 24 swings the bulb release arm 260 which depresses the cam follower 183, causing the holding roller 178 to swing outwardly from its normal position between the spindles 190 while the transfer arm 246 swings in an accurate path bringing a bulb into place between the spindles 190 at station A. Reversed motion of the arm 260, releases roller 178 to hold the bulb spindles 190.

Simultaneously with the transfer of bulbs feeding of the exhaust tubes takes place at station A' through employment of the mechanism shown in Figure 6, located directly behind and adjacent to the bulb feed mechanism as viewed in Figure 5. In Figure 6 the base 20 (not shown) has standard 262 which supports the slightly tilted exhaust tube hopper 264 and housing 266, within which is axially grooved agitating and feed wheel 268. The tilt of the one sided hopper prevents the exhaust tubes 148 from accidentally falling out. The tubes are fed to the spindles 152 form reservoir channel 274 by escapement mechanism 270.

The tubes 148 are fed one by one by the axial channels 268a in the periphery of feed wheel 268 past the shoulder 272 and fall in proper alignment into the channel 274. The escapement 270 has solenoid 276 and plunger 278 affixed to which is rod 280 carrying a pair of spaced fingers 282 which support the exhaust tube at opposing ends. The fingers 282 advance a single tube 148, under pressure of spring 284, into position to be received by the transfer mechanism 286 while retaining the remainder through means of its elevated stops 288. When the solenoid is energized by an electrical circuit (not shown) energized in a timed relationship to the operation of cam shaft 256, the fingers are retracted for reloading.

Release arm 290 is pivoted on the lug 292 of standard 294 and carries at its lower end cam follower 290a, riding on release cam 296. When rotated clockwise by cam 296, the upper end of release lever 290 engages and depresses roller or cam follower 176 thereby lifting holding roller 156 from spindles 152 so that transfer arm 310 can feed a tube to spindles 152. Transfer arm 310 is pivoted on hollow shaft 298 and carries at its lower end cam follower 350 riding on transfer cam 304. The action of cam 304 on lever 300 causes the transfer arm 310 to move counterclockwise against tension of spring 306 into position beneath the exhaust tube 148 resting on fingers 282 of the escapement assembly. The shaft 312 is reciprocably mounted in hallow shaft 298 and has a tapered end which acts as a cam against the roller 314 at the lower end of trigger rod 316. Reciprocation of the shaft 312 may be attained either through a usual spring and solenoid arrangement similar to 276 which operates the exhaust tube escapement 270 or alternatively for example, by a lever actuated by the cam and lever arrangement used for depressing the rollers 176.

As the shaft 312 is retracted into shaft 298 by its atcuating mechanism, roller 314 rides down the incline of said shaft under pressure of compression spring 318, moving trigger rod 316 downwardly permitting tension spring 320 to rotate pivoted trigger 322 counter clockwise to engage and lock the glass tube 148 on the step 308 of the transfer arm 310, which then carries said tube into position between spindle rollers 152 at station A'. The cam action of shaft 312 then raises trigger rod 316, rotating trigger 322 to release tube 148. The action of cam 296 causes the arm 290 to release the roller 176 permitting its mate 156 to engage and hold the tube 148 in place on spindle rollers 152 as seen at positions B and B'. The rotor indexes and the feeding cycle is repeated.

In Figure 5, the standard 324 has pivoted lever 326, the opposite ends of which carry a cam follower 328 riding on cam 330, and a spring pressed brake shoe 332. To cushion the stopping action of the indexing mechanism in stepping rotor 24 cam 330 applies the shoe 332 to the rim of rotor 24 after it has moved approximately one half of its predetermined indexing distance.

Means for releasing the completed product from the machine include standard 334, pivotally mounted lever 336 having cam follower 336a riding on cam 348, and rod 338, coupling lever 336 to a second lever 342 which is mounted on shaft 346 borne by standard 340. Shaft 346 also carries a release arm 344. The action of cam 348 on lever 336 and its subsequent linkage releases the product by causing release arm 344 to depress roller 176, permitting the joined tube and bulb to drop and be removed by conveyor 350.

Figure 7 shows diagrammatically the turret and various cam tracks in developed or "stretch-out" form to explain more clearly the sequence of operations. At station A and A' simultaneous feeding of the glass tube and bulb elements 148 and 188 takes place. From station C to F inclusive the fires 166 insure a proper degree of plasticity to the juncture points of the glass elements 148 and 188 as they are brought into contact with one another for fusing under pressure of the angularly disposed rollers 156 and 178.

At F' the cam track 203 depresses the bulb release roller 183, permitting the fingers 130 of the "pullover unit" 122 (see Fig. 1) to compress the molten juncture.

The cam 209 acting on plungers 202 (Fig. 4) fixes the tube supporting element 158 against horizontal reciprocation or wander. The cam 210 brings the piercing burners 102 into position within the bulb where, in conjunction with the suction created by the air-shoe 164, an opening into exhaust tube 148 is pierced in the dome of the bulb at the seal as shown at stations G', H and H'.

At station I' the roller 190 in accordance with the rise 201 of cam track 200, presses the contour flange 192 against the dome portion of the bulb causing a slight elongation of the tube 148 at its juncture insuring a uniform tubular seal. Gradual cooling of the joined elements takes place from stations K and R inclusive where they are released to conveyor 350 through means of lever 344 previously shown and described in Figure 5.

The diameters of the spindles at the points of contact with tube and bulb and their speeds in R. P. M. are readily determined for any desired common rotational speed of tube and bulb. To prevent twisting during sealing, the angular velocities of both tube and bulb must be the same. It can be shown that for the drive employed the following relation exists (neglecting slip):

If ORPM is the object speed in R. P. M.,
    SRPM is the spindle speed in R. P. M.,
    ODIA is the object diameter, and
    SDIA is the spindle diameter at point of contact with object Then $ORPM \times ODIA = SRPM \times SDIA$ For example, if tube and bulb are to rotate at 100 R. P. M., tube diameter is ¼", and bulb diameter is ¾", then—

For the tube spindle:

$$100 \times \tfrac{1}{4} = ORPM \times ODIA$$

If SDIA is 1" then $100 \times \tfrac{1}{4} = SRPM \times 1$ and $SRPM = 25$

For the bulb spindle:

$$100 \times \tfrac{3}{4} = ORPM \times ODIA$$

If SDIA for bulb spindle is 1" then $100 \times \tfrac{3}{4} = SRPM \times 1$ and $SRPM = 75$ This is the same as saying that the ratio of the velocity of the tube supporting spindles to the velocity of the bulb supporting spindles must be inversely proportional to the ratio of the diameter of the tube to the diameter of the bulb.

From the foregoing, it will be appreciated that machines according to the present invention are particularly suited for uniting two glass tubes of different diameters in end to end assembly. The rollers or spindles 152 support the exhaust tube in horizontal axial abutting relationship with the bulb 188 which in turn is supported on the rollers or spindles 190. The peripheral surface portions of the annular extensions 150 of the rollers 152 provide surfaces which move continuously in and out of frictional engagement with the outer surface of the exhaust tube 148 for rotating the same about an axis common with the axis of the bulb body 188. The peripheral surfaces of the rollers of spindles 190 move continuously in and out of frictional contacting engagement with the outer surface of the bulb body 188 to achieve its rotation. The respective rollers, spindles or spindle elements for the exhaust tube and the bulb body each defines a cradle controlling the position of the associated part; and in association with the hold down elements 156, 178 and the spring biased-tubular element 158 allow the tube assemblies to be transported about a circular path, as determined by the supporting turret 24. The described structure facilitates the assemblies of tubular glass members, usually of different diameters, at comparatively high speeds and in a manner compatible with the formation of a clear passage between the respective glass members.

While we have shown and described certain preferred embodiments of our invention, it will be understood that modifications and changes may be made without departing from the spirit and scope thereof, as will be clear to those skilled in the art.

In the specification we have explained the principles of our invention and the best mode in which we have contemplated applying those principles, so as to distinguish our invention from other inventions, and we have particularly pointed out and distinctly claimed the part, improvement or combination which we claim as our invention.

What we claim is:

1. In mechanism of the class described, a first pair of rotary spindles having their axes parallel and adjacent, said first pair of spindles being arranged to rotate and support a first cylindrical object between them, a retaining element arranged to make contact with said first object and to hold it against said first pair of spindles while permitting rotation thereof, a second pair of spindles of a diameter differing from that of said first pair of spindles and axially alined with the first pair of spindles to rotate and support a second object to be joined to said first object, said second object having a different diameter than said first object, a second retaining element arranged to make contact with said second object and to hold it against said second pair of spindles while permitting rotation thereof, and means for rotating said first and second pairs of spindles at speeds such that said first and second objects supported thereby rotate at the same angular velocity.

2. In mechanism of the class described, a first pair of rotary spindles having their axes parallel and adjacent and arranged to support and permit rotation of a first cylindrical fusible object pressed thereagainst, a second pair of spindles of a diameter differing from that of said first pair, said second pair of spindles being axially alined with the first pair and arranged to support and permit rotation of a second cylindrical fusible object to be joined to the first object, said second object having a different diameter than said first object, releasable retaining elements pressing said first and second objects against the respective pairs of spindles, a movable carrier, said pairs of spindles being mounted on said movable carrier for translatory motion both vertically and horizontally, and means for rotating said first and second pairs of spindles at speeds such that said first and second objects supported thereby rotate at the same angular velocity.

3. In mechanism of the class described, a first pair of rotary spindles having their axes parallel and adjacent and arranged to support and permit rotation of a first cylindrical fusible object pressed thereagainst, a second pair of spindles of a diameter differing from that of said first pair, said second pair of spindles being axially alined with the first pair and arranged to support and permit rotation of a second cylindrical fusible object to be joined to the first object, said second object having a different diameter than said first object, releasable retaining elements pressing said first and second objects against the respective pairs of spindles, a movable carrier mounted for travel about a horizontal axis, said pairs of spindles being mounted on said movable carrier with their respective axes horizontal for translatory motion both vertically and horizontally, and means for rotating said first and second pairs of spindles at speeds such that said first and second cylindrical objects supported thereby rotate at the same angular velocity.

4. In mechanism of the class described, a first pair of rotary spindles having their axes parallel and adjacent and arranged to support and permit rotation of a first cylindrical fusible object pressed thereagainst, a second pair of spindles of a diameter differing from that of said first pair, said second pair of spindles being axially alined with the first pair and arranged to support and permit rotation of a second cylindrical fusible object to be joined to the first object, said second object having a different diameter than said first object, releasable retaining elements pressing said first and second objects against the respective pairs of spindles, a movable carrier, said pairs of spindles being mounted on said movable carrier for translatory motion both vertically and horizontally, means for rotating said first and second pairs of spindles at speeds such that said first and second cylindrical objects supported thereby rotate at the same angular velocity, and individual means for feeding objects to the respective pairs of spindles at one position thereof and for effecting release of said objects at another position thereof.

5. In a mechanism of the class described, a first pair of rotary spindles of a given diameter having their axes parallel and adjacent, said spindles being arranged to rotate and support a first cylindrical object between them, a drive for turning said first pair of spindles, a retaining element arranged to make contact with said object and to hold it against said spindles while permitting rotation thereof, a second pair of spindles of a different diameter than the first pair axially aligned with said first pair to rotate and support a second cylindrical object of different diameter from said first object to be joined to said first object, a drive for turning said second pair of spindles at a different rate than said first pair of spindles, said rate being such that both of said cylindrical objects are turned at the same angular velocity, and a second retaining element arranged to make contact with said second object and to hold it against said second spindles while permitting rotation thereof.

6. In a machine for joining cylindrical objects, a first pair of rotary spindles having their axes parallel and adjacent, a second pair of spindles in abutting alignment with the first pair of spindles, said pairs of spindles being disposed to support the cylindrical objects being joined in axial alignment, means for driving said pair of spindles at speeds for rotating said cylindrical objects at the same angular velocity, and separate loaders for independently and simultaneously feeding said objects to said first and second pairs of spindles.

7. In a machine for joining cylindrical objects, a first pair of rotary spindles having their axes parallel and adjacent, a second pair of spindles of a different diameter than said first pair axially aligned with the first pair, said first pair of spindles and said second pair of spindles being disposed in abutting relationship so as to provide coaxial support for cylindrical objects disposed thereon, means for driving said pairs of spindles at speeds for rotating said cylindrical objects at the same angular velocity, and separate loaders for independently feeding said objects to each of said pairs of spindles.

8. In a machine for joining cylindrical objects, a first group of revolving supporting members disposed generally parallel to an axis, a second group of revolving supporting members disposed parallel to said axis of adjacent said first group of supporting members revolving the members of said first group at one angular velocity, means for revolving the members of said second group at another angular velocity, and means for independently feeding objects to each of said groups of supporting members.

9. In a machine for joining cylindrical objects of different diameters, a first pair of rotary spindles having parallel axes and disposed parallel to an axis to receive and support a first cylindrical object, a second pair of rotary spindles having parallel axes and disposed parallel to said axis to receive and support a second object in axial abutting alignment with said first object, said second spindles having a different radius than said first spindles, and drivers for turning said first and second pairs of spindles at such a speed that the ratio of the peripheral velocity of the first and second pair of spindles is inversely proportional to the ratio of the diameters of the first cylindrical object to the second cylindrical object.

10. The combination of claim 9 in which means are provided for causing reciprocating axial motion between said pairs of spindles.

11. The apparatus of claim 9 in which said pairs of spindles are carried on a rotor mounted for rotation about a horizontal axis, said spindles being mounted with their axes parallel to the axis of said rotor, and having a loader for individually feeding in cylindrical objects of one diameter to each pair of said first spindles at a position of said rotor and having another loader for feeding cylindrical objects of a different diameter to each pair of said second spindles, and means for effecting release of the joined object at another position of said rotor.

12. In a machine for joining cylindrical objects of different diameters, first and second groups of supporting members, each group of supporting members including a number of rolling contact surfaces disposed to support one of said cylindrical objects horizontally, the rolling surfaces of said first group being of a different diameter than the rolling surfaces of said second group and the surfaces of each group being spaced from a common axis to support said cylindrical objects in axial abutting relationship, and drivers for turning the rolling contact surfaces in each group at peripheral velocity inversely proportional to the spacing of said surfaces from said common axis, whereby said cylindrical objects are rotated at a common angular velocity.

13. The machine of claim 12 having retractable retaining members associated with each of said groups of supporting members and urged towards said supporting members along a path passing to the space to be occupied by the cylindrical object worked upon, and having a puddling mechanism for producing a reciprocating motion between said groups of supporting members and parallel to said axis while said retractable retaining members press said cylindrical objects against said supporting members.

14. The machine according to claim 12 in which said groups of supporting members are supported horizontally on the periphery of a conveyor for translation about a horizontal axis, driving means for said conveyor, and separate driving means connected to said rolling contact surfaces.

15. In a machine for joining hollow cylindrical objects, means for supporting said objects in horizontal axial abutting relationship and rotating said objects at the same angular velocity about a common axis, said means including surface portions moving continuously in and out of frictional contacting engagement with the outer surfaces of said objects, means for heating said objects in the region of abutting relationship, means for axially penetrating one of said objects in the region of abutting relationship to assure the presence of a passage therethrough, and means for producing relative reciprocating motion between said objects while they are in a plastic state to work the joint.

16. A machine for uniting two glass tubes in an end-to-end assembly, including a first set of tube rotating elements of the type having surface portions traveling with the tube rotated while other surface portions move into contact with the tube and out of contact with the tube, respectively, to thereby rotate the tube about its axis and defining a tube-receiving cradle controlling the position of the axis of the tube, said elements defining passages through which the tube laterally enters and leaves said cradle, a second set of such tube rotating elements disposed opposite said first set, means supporting both said sets of tube rotating elements and effective to constrain tubes carried thereby with an end of each tube disposed opposite an end of the other and in axially alignment therewith and to transport those tubes laterally along a predetermined path while rotating at the same angular rate, means disposed along said path effective to heat the opposed tube ends to fusing temperature, means for pushing said tubes into endwise abutment when fused, and a pair of tube-supply feeding mechanisms along said path respectively opposite said sets of tube gripping and rotating elements and effective to deposit tubes laterally into the respective cradles.

17. The method of joining two tubes in end to end assembly including the steps of arranging said tubes in axial alignment and in endwise juxtaposition in a processing region, tangentially and frictionally contacting said tubes to rotate said tubes at the same angular rate, heating the juxtaposed ends of said tubes to fusing temperature while said tubes are urged endwise against each other, directing a source of heat axially into one of said tubes, and drawing a vacuum in the other one of said tubes while the heat is directed axially into said one tube whereby a passage is formed between said tubes.

18. In a multiple-station machine for joining a tubular extension to the closed end of a bulb body, a drum-like turret rotatable about a horizontal axis, work holding and turning mechanisms at spaced locations about the periphery of said turret each including rolling contact surfaces defining axially aligned cradles for supporting said extension and bulb body in endwise juxtaposition with one end of said extension contacting said bulb body at a region of joining, means for turning the rolling contact surfaces of each cradle at peripheral velocities selected to rotate said extension and bulb body at a common angular velocity, means operatively connected to said turret for intermittently indexing said turret to advance said work holding and turning mechanisms through successive stations of said machine, feeding means at first and second stations of said machine coordinated to simultaneously deliver tubular extensions and bulb bodies to said work holding and turning mechanisms, means at further stations of said machine for heating said region of joining to render the same plastic, a burner effective at still further stations of said machine for endwise advance into successive bulbs, and means for drawing a vacuum on successive extensions at said still further stations operable simultaneous with the advance of said burner for drawing a vacuum in an extension while said burner directs heat internally of a bulb body toward said region of joining whereby an opening is created from the bulb body into the extension.

19. In a multiple-station machine for joining a tubular extension to the closed end of a bulb body, a drum-like turret rotatable about a horizontal axis, work holding and turning mechanisms at spaced locations about the periphery of said turret each including rolling contact surfaces defining axially aligned cradles for supporting said extension and bulb body in endwise juxtaposition with one end of said extension contacting said bulb body at a region of joining, means for turning the rolling contact surfaces of each cradle at peripheral velocities selected to rotate said extension and bulb body at a common angular velocity, means operatively connected to said turret for intermittently indexing said turret to advance said work holding and turning mechanisms through successive stations of said machine, feeding means at first and second stations of said machine coordinated to simultaneously deliver tubular extensions and bulb bodies to said work holding and turning mechanisms, means at further stations of said machine for heating said region of joining to render the same plastic, a burner arranged for endwise advance into successive bulbs at further stations of said machine, vacuum-drawing means effective on successive extensions at said still further stations and operable simultaneously with the advance of said burner for drawing a vacuum in an extension while said burner directs heat internally of a bulb body toward said region of joining whereby an opening is created from the bulb body into the extension, contouring means at a still further station of said machine engageable against the closed end of successive bulb bodies, and means at a still further station of said machine for unloading the completed assemblies.

20. In a multiple-station machine for joining a tubular extension to the closed end of a bulb body, a drum-like turret rotatable about a horizontal axis, work holding and turning mechanisms at spaced locations about the periphery of said turret each including rolling contact surfaces defining axially aligned cradles for supporting said extension and bulb body in assembly with one end of said extension contacting said bulb body at a region of joining, respective retractible hold down means over each of said cradles and engageable with said extension and said bulb body to confine said assembly in said cradles, means for turning the rolling contact surfaces of each cradle at peripheral velocities selected to rotate said extension and bulb body at a common angular velocity, means operatively connected to said turret for intermittently indexing said turret to advance said work holding and turning mechanisms through successive stations of said machine, feeding means at first and second stations of said machine coordinated to simultaneously deliver tubular extensions and bulb bodies to said work holding and turning mechanisms, means at said first and second stations operable in advance of said feed means for retracting the respective hold down means, means at further stations of said machine for heating said region of joining to render the same plastic, a burner at a still further station of said machine arranged for endwise advance into successive bulbs, and vacuum-drawing means effective on successive extensions at said still further station and operable simultaneous with the advance of said burner for drawing a vacuum in an extension while said burner directs heat internally of a bulb body toward said region of joining whereby an opening is created from the bulb body into the extension.

21. In a machine for joining an exhaust tube to the dome of a bulb body, first and second pairs of supporting means each including side by side rolling contact surfaces, the rolling contact surfaces of said first pair being of a larger diameter than the rolling contact surfaces of the second pair, the first and second pairs of rolling contact surfaces defining respective axially aligned seats for said exhaust tube and said bulb body, means effective to urge one end of said exhaust tube into contact with the dome of said bulb body, and means operatively connected to said first and second pairs of supporting means for turning the rolling contact surfaces of the respective seats at rates selected to rotate said exhaust tube and said bulb body at the same angular rate.

22. In a multiple-station machine for joining a tubular extension to the closed end of a bulb body, a drum-like turret rotatable about a horizontal axis, work holding and turning mechanisms at spaced locations about the periphery of said turret each including rolling contact surfaces defining axially aligned cradles for supporting said extension and bulb body in endwise juxtaposition, means including an axially shiftable plunger engaging said extension and urging one end of said extension into contact with said bulb body at a region of joining, means for turning the rolling contact surfaces of each cradle at peripheral velocities selected to rotate said extension and bulb body at a common angular velocity, means operatively connected to said turret for intermittently indexing said turret to advance said work holding and turning mechanisms through successive stations of said machine, means at stations of said machine for heating said region of joining to render the same plastic, a burner disposed axially of and spaced outwardly of its cradle, means at further stations of said machine arranged to advance said burner endwise into successive bulbs, and vacuum-drawing means effective on successive extensions at said further stations and operable simultaneous with the advance of said burner for drawing a vacuum in an extension while said burner directs heat internally of a bulb body toward said region of joining whereby an opening is created in the bulb body into the extension.

23. In a multiple-station tabulating machine for joining an exhaust tube to the dome of a bulb body, a first pair of turning members arranged in side by side adjacent relationship and turnable about parallel horizontal axes, said first pair defining a first cradle for said exhaust tube, first retractable hold down means over said first cradle and engageable against said exhaust tube for confining same in said first cradle, a second pair of turning members arranged in side by side adjacent relationship and turnable about parallel horizontal axes, said second pair defining a second cradle for said bulb body in end to end alignment with said first cradle, second retractable hold down means over said second cradle and engageable against said bulb body for confining same in said second cradle, means operatively connected to said first and second pairs of turning members for rotating the same whereby the cradle-forming surfaces are effective to turn said exhaust tube and bulb body at the same angular rate, loading means at first and second stations of said machine operative to deposit an exhaust tube in said first cradle and a bulb body in said second cradle, and means at said first and second stations operable in timed relation to said loading means for retracting the respective hold down means in advance of operation of the respective loading means.

24. In a machine for joining an exhaust tube to the dome of a bulb body, first and second pairs of supporting means each including side by side rolling contact surfaces, the rolling contact surfaces of said first pair being of a larger diameter than the rolling contact surfaces of the second pair, the first and second pairs of rolling contact surfaces defining respective axially aligned seats for said exhaust tube and said bulb body, means effective to urge one end of said exhaust tube against the dome of said bulb body in a contact region, means operatively connected to said first and second pairs of supporting means for turning the rolling contact surfaces of the respective seats at rates selected to rotate said exhaust tube and said bulb body at the same angular rate, means for heating said exhaust tube and said bulb body in said contact region to render said contact region plastic, and means for axially penetrating the dome of said bulb body to provide an opening from said exhaust tube into said bulb body.

25. In a machine for joining an exhaust tube to the dome of a bulb body, first and second pairs of supporting means each including side by side rolling contact surfaces, the rolling contact surfaces of said first pair being of a larger diameter than the rolling contact surfaces of the second pair, the first and second pairs of rolling contact surfaces defining respective axially aligned seats for said exhaust tube and said bulb body, means effective to urge one end of said exhaust tube against the dome of said bulb body in a contact region, means operatively connected to said first and second pairs of supporting means for turning the rolling contact surfaces of the respective seats at rates selected to rotate said exhaust tube and said bulb body at the same angular rate, means for heating said exhaust tube and said bulb body in said contact region to render said contact region plastic, means for axially penetrating the dome of said bulb body to provide an opening from said exhaust tube into said bulb body, and means operatively connected between said first and second pairs of supporting means for producing relative reciprocation between said exhaust tube and said bulb body.

26. In a machine for joining hollow cylindrical objects, rolling contact means for supporting said objects in axial abutting relationship, means operatively connected to said rolling contact means for rotating said objects at the same angular velocity about a common axis, means for heating said objects in the region of axial abutting, a burner, means operatively connected to said burner for advancing the same axially of and into one of said objects, and means operable on the other of said objects for drawing a vacuum therein substantially simultaneous with axial advance of said burner whereby said objects are joined and a passage created between said objects.

27. In a machine for joining hollow cylindrical objects, rolling contact means for supporting said objects in axial abutting relationship, means operatively connected to said rolling contact means for rotating said objects at the same angular velocity about a common axis, means for heating said objects in the region of axial abutting, a burner, means operatively connected to said burner for advancing the same axially of and into one of said objects, means operable on the other of said objects for drawing a vacuum therein substantially simultaneous with axial advance of said burner whereby said objects are joined and a passage created between said objects, and means for producing relative reciprocating movement between said objects while said region is plastic to work the joint between said objects.

28. In a multiple-station tubulating machine for joining an exhaust tube to the dome of a bulb body, a first pair of turning members arranged in side by side adjacent relationship and turnable about parallel horizontal axes, said first pair defining a first cradle for said exhaust tube, a second pair of turning members arranged in side by side adjacent relationship and turnable about parallel horizontal axes, said second pair defining a second cradle for said bulb body in end to end alignment with said first cradle, means including a spring-biased tubular element urged into axial contact with said exhaust tube for urging said exhaust tube into engagement with the dome of said bulb body, means operatively connected to said first and second pairs of turning members for rotating the same whereby the cradle-forming surfaces are effective to turn said exhaust tube and bulb body at the same angular rate, means operative during the machine cycle to produce relative axial motion between said first and second pairs of turning members to puddle the joint between said exhaust tube and said bulb body, and means operative to lock said tubular element against axial movement during the relative axial motion between said exhaust tube and said bulb body.

29. In a multiple-station tubulating machine for joining an exhaust tube to the dome of a bulb body, a first pair of turning members arranged in side by side adjacent relationship and turnable about parallel horizontal axes, said first pair defining a first cradle for said exhaust tube, first retractable hold down means over said first cradle and engageable against said exhaust tube for confining same in said first cradle, a second pair of turning members arranged in side by side adjacent relationship and turnable about parallel horizontal axes, said second pair defining a second cradle for said bulb body in end to end alignment with said first cradle, second retractable hold down means over said second cradle and engageable against said bulb body for confining same in said second cradle, means including a spring-biased tubular element urged in axial contact with said exhaust tube for urging said exhaust tube against the dome of said bulb body, means operatively connected to said first and second pairs of turning members for rotating the same whereby the cradle-forming surfaces are effective to turn said exhaust tube and bulb body at the same angular rate, means operative during the machine cycle to produce relative axial motion between said first and second pairs of turning members to puddle the joint between said exhaust tube and said bulb body, and means operative to lock said tubular element against axial movement during the relative axial motion between said exhaust tube and said bulb body.

References Cited in the file of this patent

UNITED STATES PATENTS

| | | |
|---|---|---|
| 614,841 | Conde | Nov. 29, 1898 |
| 1,489,836 | King | Apr. 8, 1924 |
| 2,234,302 | Dichter | Mar. 11, 1941 |
| 2,553,135 | Eisler | May 15, 1951 |
| 2,549,762 | Baker et al. | Apr. 24, 1951 |
| 2,565,061 | Bednary | Aug. 21, 1951 |
| 2,662,345 | Ruggiero | Dec. 15, 1953 |

FOREIGN PATENTS

| | | |
|---|---|---|
| 242,213 | Great Britain | Dec. 3, 1925 |
| 422,436 | Great Britain | Jan. 11, 1935 |
| 467,282 | Great Britain | June 15, 1937 |
| 527,692 | Great Britain | Oct. 14, 1940 |
| 536,858 | Great Britain | May 29, 1941 |
| 943,897 | France | Mar. 21, 1949 |